Figure 3:
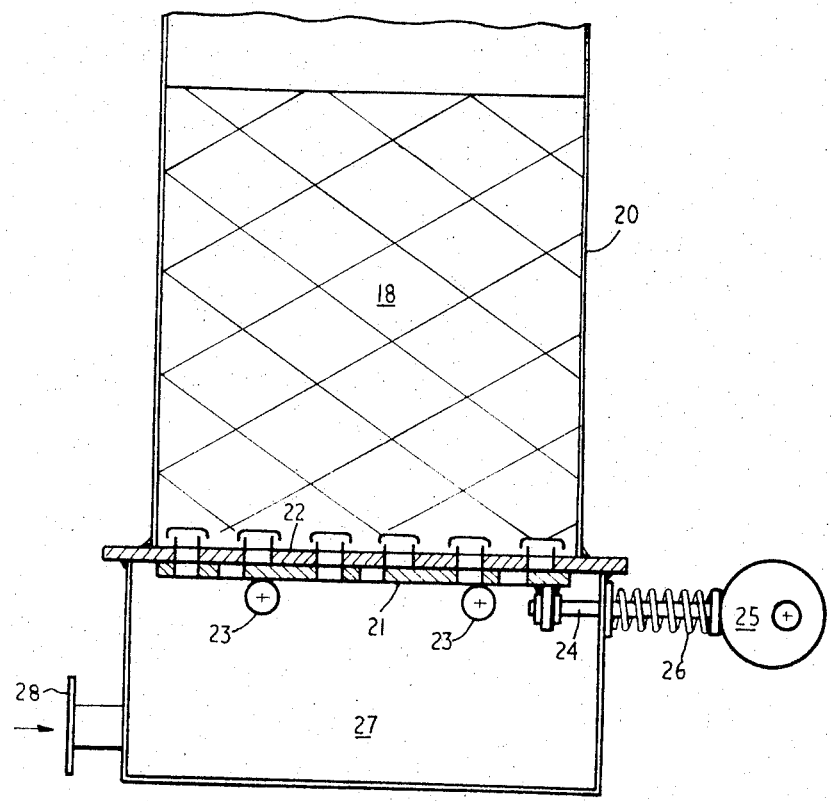

United States Patent [19]
Doig

[11] 3,867,114
[45] Feb. 18, 1975

[54] DEVICES WHEREBY THE LOCAL FLUID RATES IN A FLUIDISED BED ARE MADE TO FLUCTUATE

[75] Inventor: Ian Dracup Doig, Roseville Chase, New South Wales, Australia

[73] Assignee: Unisearch Limited, Kensington, Wales

[22] Filed: Apr. 23, 1973

[21] Appl. No.: 353,888

[30] Foreign Application Priority Data
Apr. 27, 1972  Australia............................. 8768/72

[52] U.S. Cl................................... 55/77, 34/57 A
[51] Int. Cl............................................ B01d 53/06
[58] Field of Search........... 55/77, 79, 74, 179, 181, 55/390; 34/57 A, 57 R

[56] References Cited
UNITED STATES PATENTS
| | | | |
|---|---|---|---|
| 2,813,351 | 11/1957 | Godel | 34/57 A |
| 3,503,184 | 3/1970 | Knapp et al. | 55/71 |
| 3,605,276 | 9/1971 | Enters | 34/57 A |

Primary Examiner—Charles N. Hart
Attorney, Agent, or Firm—Browdy and Neimark

[57]  ABSTRACT

A method of operating a fluidised bed and apparatus for carrying out the operation by means of which the rate of flow of fluid entering the bed from particular regions of the grid is varied while the gross flow of fluid is maintained substantially invariant, to assist in avoiding the formation of preferred channels or paths through the bed by the entering gas or vapor.

4 Claims, 3 Drawing Figures

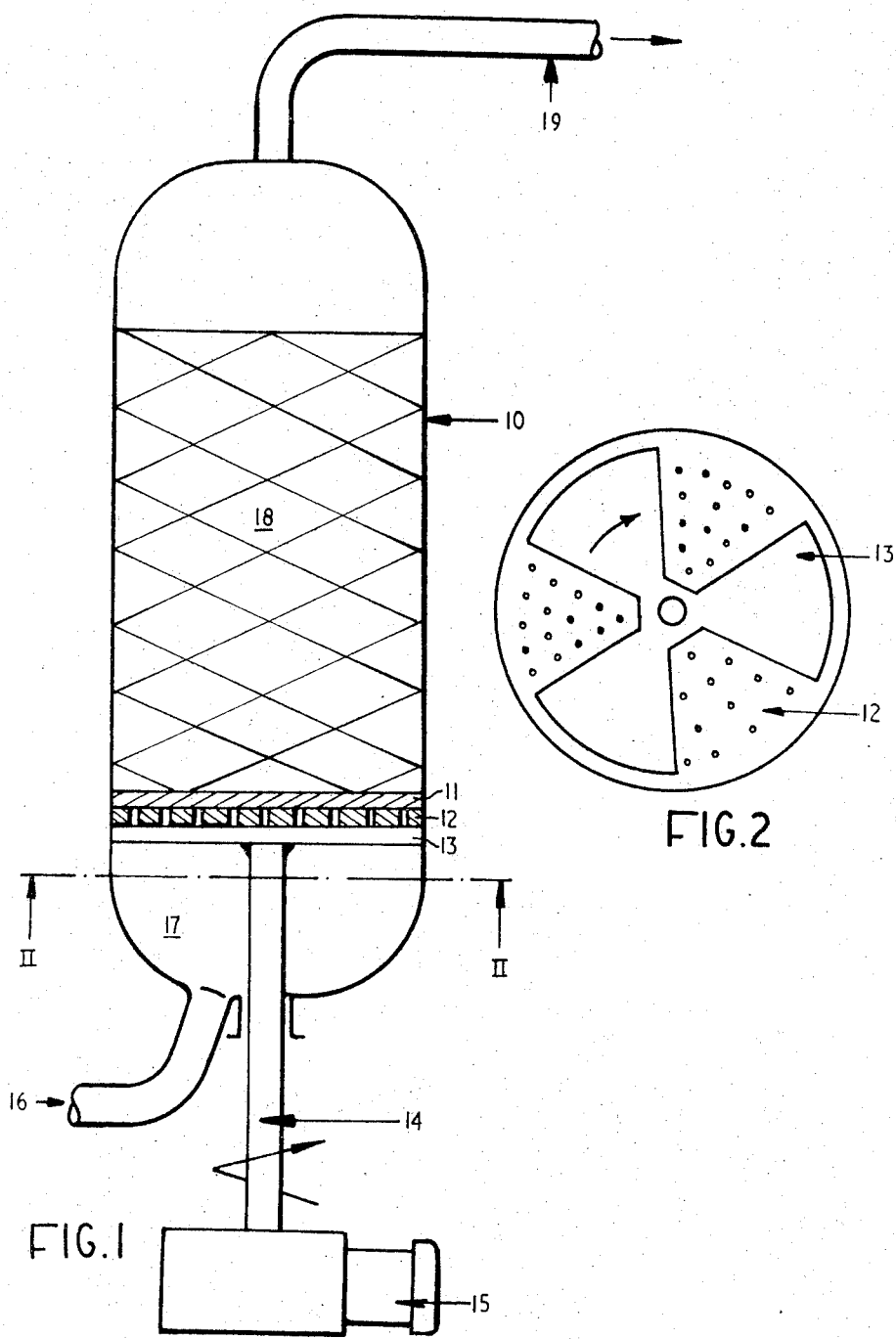

DEVICES WHEREBY THE LOCAL FLUID RATES IN A FLUIDISED BED ARE MADE TO FLUCTUATE

This invention is an improvement in the method of operating fluidised bed processes in which a gas or vapor is delivered through a grid or other support containing ports or passages for the gas or vapor to the base of a bed of discrete granular solid particles. (The term "grid" as used in this specification is to be taken to include any such support). In a typical fluidised bed, the gas or vapor enters the bed of particles at a rate sufficiently high to raise the particles and impart to them individual or aggregate motions: a bed thus agitated by the gas or vapor is said to be fluidised.

During the fluidisation the gas or vapor exchanges material or heat separately or simultaneously with the solid particles in the bed besides the mechanical energy the gas or vapor delivers to the bed. In other versions a liquid enters either with the gas or separately and transfers material (often a solute) to the particles in the bed or serves to form discrete agglomerates of particles in the bed (a process termed "granulation").

The extent to which a fluidised bed process is successful depends, inter alia, on the uniformity and intimacy with which the contacting phases (gas or vapor, liquid (where present), dispersed solid particles) mix. In many industrial fluidised bed processes this mixing may be markedly nonuniform, and, in the absence of remedies large proportions of the entering gas or vapor establish preferred channels or paths through the bed and escape from it almost without mixing with any of the particles of the bed.

Methods of remedying this situation are:

1. Provide a bed support which offers a high resistance to the gas or vapor flow. This ensures that the gas or vapor entering the base of the bed of particles will do so at a fairly uniform flow rate.
2. Operate the bed at very high gas rates. This achieves firstly an effect similar to (1) above and imparts a high degree of turbulence to the particles in the bed with the result that they mix well, with the gas or vapour.
3. Stir the fluidised bed using paddles.
4. Rotate the grid which supports the bed.
5. Vibrate the bed.
6. Introduce the gas or vapor as a series of pulses instead of introducing it at a relatively uniform rate of flow.

These latter four devices ((3), (4), (5), and (6) above) are all designed to prevent the establishment of preferred gas or vapor paths through the fluidised bed.

The present invention provides an alternative method of preventing the establishment of undesirable preferred paths by varying the effective resistance of the grid to the flow of the gas or vapor in a programmed manner utilising means which causes the gas or vapor flow rate entering the bed from particular regions of the grid to vary while the gross gas or vapor flow rate remains substantially invariant.

The present invention consists in a method of operating a fluidised bed process to prevent the establishment of undesirable preferred paths in the bed for the fluidising fluid wherein the effective resistance of the grid of the bed to the flow of the fluid is varied in a programmed manner, the rate of flow of fluid entering the bed from a particular region of the grid being varied while the gross fluid flow is maintained substantially invariant.

The present invention further consists in the provision in a fluidised bed of means for cyclically obstructing the fluid flow through the points or passages in the grid, the said means acting to shut off wholly or partly the flow of fluid through regions of the grid in turn.

In order that the invention may be better understood and put into practice a preferred form thereof is hereinafter described, by way of example, with reference to the accompanying drawings in which:

FIG. 1 is a sectional elevation of apparatus incorporating the present invention, FIG. 2 is a cross-sectional view on line II—II of FIG. 1, and, FIG. 3 is a sectional elevation of apparatus incorporating an alternative embodiment of the present invention.

In the apparatus shown in FIG. 1.

10 is a cylindrical vessel containing the fluidised bed, 11 is a thin porous plate on which the bed of particles sit. Its purpose is to prevent particles entering the perforations in the plate, 12 immediately below it. 13 is a rotating louver or flat vane which impedes or completely interupts (depending on how close it is to the flat underside of the perforated plate 12), the flow of gas to the individual perforations in the plate 12 as it rotates. (Items 11, 12, and 13 constitute the grid). The rotating louver 13 is driven by a variable speed electric drive 15 by way of the shaft 14.

The fluidising gas stream enters at the inlet duct 16 into the plenum chamber 17 below the bed, passes through the ports in the rotating louver 13, the perforations and the porosities in the plates 12 and 11, enters the bed of granular particles 18 fluidises these and finally leaves through the exit duct 19 at the top of the cylindrical vessel 10. In operation the rotational speed of the louvre 13 and the gas flow rate are adjusted to obtain a best fluidised bed performance.

FIG. 3 shows an alternative arrangement in which a vessel 20 containing a fluidised bed is provided with a reciprocating plate 21, to cyclically impede the gas flow to a row of ports in the bed support plate 22 (In this figure bubble caps are shown above each gas port). The rollers 23 hold the reciprocating plate 21 against the underside of stationary plate 22. The rod, 24 is attached to plate 21 at one end while the other end is held against a rotating cam 25, by the spring 26. Gas enters the plenum chamber 27 through port 28. In the figure plate 21 is at one extreme of its travel and in principle gas enters the bed through only half of the ports and bubble caps in the row shown: gas flow to the remaining (alternatively positioned) ports is a shut-off by the relative juxtaposition of the ports in plates 21 and 22. (In practice this shutoff will be incomplete and some leakage may be desirable). When the plate 21 has travelled (following a half revolution of cam 25) to its other extreme, those ports which were previously shutoff will be fully exposed to gas flow and those previously exposed will be shut-off. In operation the rotational speed of the cam 25 and the gas flow rate are adjusted to obtain a best fluidised bed performance.

The method of the present invention offers advantages over the known methods described under the notes (1) to (6) above in that the net grid resistance need not be high and the energy required to obtain a satisfactory performance should be less with the present invention than in the methods listed under notes (1) to (6) above. It also offers advantages in that fluidised beds using this method can be operated at fluid rates below the minimum fluidisation rates for conventionally fluidised beds.

The benefit to be obtained from the use of a method according to the invention are illustrated by the experimental results described below.

In this experiment a bed of annular cross-section, 5.75 inches outer- and 4.00 inches inner-diameter was constructed with tubular Perspex walls. (The annular cross section was chosen for experimental convenience in that it allows a lamp to be placed within the inner (4 inches outer-diameter) Perspex tube; relative attenuation of the illumination through the surrounding annular bed allows an assessment of how uniformly (or otherwise) the bed is being fluidised.

The bed support plate contained 12 0.375 inch diameter gas ports whose centers were equally spaced around a 5 inch diameter circle. Each of these gas ports was covered with open weave cloth across their top and contained a small orifice plate and pressure taps to allow individual port gas flows to be separately measured. A vane below the grid had two lobes (instead of three as shown in FIG. 1) each subtending 90° of arc; in operation these obstructed air flow to half of the ports in the super-positioned plate.

In the experiments two powders were fluidised, sand and feldspar; their properties are given in Table 1. With the vane removed the sand fluidised well, but in the case of the feldspar relatively stable and substantially vertical channels formed through the bed and only the powder in these channels appeared mobile.

Measurements of the variance in gas flow through the bed support plate orifices showed that with the vane removed, minimum variance was obtained at an air rate 4.1 and 3.8 times the minimum fluidisation rate respectively for the feldspar and the sand, the minimum variance for the feldspar being 7.5 times that for the sand.

With the vane in position and rotating at speeds between 35 and 60 revolutions per minute these minimum variances occurred at 2.5 and 3.3 times the minimum fluidisation rate for the feldspar and sand respectively and the variances obtained were 20% (feldspar) and 50% (sand) of the variances obtained with the vane removed. A particular feature of operating with the rotating vane was that a satisfactorily bubbling bed was obtained for the sand at gross air rates of 0.65 times the minimum fluidisation rate.

TABLE 1

| Powder Properties | | |
|---|---|---|
| Powder | Sand | Feldspar |
| Bulk density (lb/cu. ft.) | 90 | 65 |
| Angle of repose (degrees) | 30 | 45 |
| Minimum fluidisation rate (ft./sec.) | 0.21 | 0.17 |
| Mean particle diameter (micro metres) | 170 | 38 |

The method according to the invention may be carried out by means of a variety of different forms of apparatus other than those described above and these may have or include:

Variations of the examples provided may have or include a. ports in the rotating or reciprocating louvers of other shapes and a different number of ports.

b. perforations through the louver vanes.

c. adjacent surfaces (between items 12 and 13 in FIG. 1) and 22 and 23 in FIG. 3 which are other than flat.

d. devices in which the grid plates are not circular and in which the louvers providing the variation in resistance to the gas flow are either oscillated or reciprocated.

e. devices in which the fluidising gas is supplied to individual gas entry ports at the base of the bed or groups of these ports by way of a separate, programmed valve system.

f. fluidised bed systems in which the fluidising gas enters the base of the bed through ports other than those which may or may not be provided in the bed supporting plates and in which the gas supply is made to fluctuate in the manner described under note (e) above.

g. devices employing more than one rotating, oscillating or reciprocating louver.

h. devices where the louver is guided and moves between two perforated plates.

I claim:

1. A method of operating a fluidized bed comprising: varying the effective resistance of the grid of the bed to the flow of fluid in a programmed manner, by selectively opening a portion of some holes while simultaneously closing an equivalent portion of other holes elsewhere in the grid, and continuously changing the holes being opened and closed, whereby gross fluid flow is maintained substantially invariant and preferred channels are avoided.

2. In a fluidized bed apparatus comprising a housing, inlet means, outlet means and a bed support plate having a plurality of holes therethrough, the improvement wherein said apparatus further comprises:
means for cyclically obstructing fluid flow through a number of said holes and simultaneously allowing fluid flow through the remainder of said holes, the individual holes in said number changing during the course of said cycle, leaving the gross fluid flow through the bed support plate substantially invariant throught said cycle.

3. An apparatus in accordance with claim 2, wherein said means comprises:
a movable flat plate disposed immediately adjacent to said bed support plate, said flat plate having a first plurality of holes which can align with a first plurality of holes in said bed support plate and a second plurality of holes which are out of alignment with a second plurality of holes in said bed support plate when said first pluralities are in alignment, said second plurality of holes in said flat plate being alignable with said second plurality of holes in said bed support plate upon motion of said flat plate at which time said first pluralities of holes will be out of alignment; and
means for oscillating said flat plate.

4. An apparatus in accordance with claim 2, wherein said means comprises:
a non-perforated flat vane, rotatable around the vertical axis of said housing, disposed immediately adjacent to said bed support plate, said vane, in each position of the rotation thereof, obstructing fluid flow through the same proportion of holes in said bed support plate and allowing fluid flow through the remainder of said holes.

* * * * *